(12) United States Patent
Sivinski

(10) Patent No.: US 10,190,627 B2
(45) Date of Patent: Jan. 29, 2019

(54) AGRICULTURAL PLANTER HAVING TAPERED BEARINGS ON ROW UNIT MOUNTING BRACKET

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 59 days.

(21) Appl. No.: 15/451,878

(22) Filed: Mar. 7, 2017

(65) Prior Publication Data

US 2017/0261034 A1    Sep. 14, 2017

Related U.S. Application Data

(60) Provisional application No. 62/304,969, filed on Mar. 8, 2016.

(51) Int. Cl.
*F16C 17/10* (2006.01)
*F16C 33/20* (2006.01)
(Continued)

(52) U.S. Cl.
CPC ............ *F16C 25/02* (2013.01); *A01B 59/002* (2013.01); *A01B 71/04* (2013.01); *A01C 7/08* (2013.01);
(Continued)

(58) Field of Classification Search
CPC ...... F16C 25/02; F16C 25/00; F16C 2204/12; F16C 2204/10; F16C 2204/00; F16C 2204/14; F16C 2310/00; F16C 17/10; F16C 17/00; F16C 33/104; F16C 33/103; F16C 33/1025; F16C 33/10; F16C 33/06; F16C 33/04; F16C 33/02; F16C 33/00; F16C 33/24; F16C 11/04; F16C 11/00; A01B 71/04; A01B 71/00; A01B 59/002;
(Continued)

(56) References Cited

U.S. PATENT DOCUMENTS 1,768,460 A    6/1930   Boden
2,815,991 A   12/1957   Stoffel
(Continued)

FOREIGN PATENT DOCUMENTS

CA    2417762 C    8/2006
DE    3025020 A1   4/1982
(Continued)

OTHER PUBLICATIONS

Harvest International, Inc., PCT/US2017/021099, "The International Search Report and the Written Opinion of the International Searching Authority, or the Declaration," dated May 18, 2017.

*Primary Examiner* — Christopher J. Novosad
(74) *Attorney, Agent, or Firm* — McKee, Voorhees & Sease, PLC

(57) ABSTRACT

Tapered bearings are used on each end of each link arm on an agricultural seed row planter mounted on a toolbar. The bearing is a low friction material and greaseless. The tapered design of the bearings allows the bearings to be adjusted as wear occurs, by tightening the link arm mounting nut which extends through the tapered bearing. The tapered bearing has an increased life and reduced maintenance, as compared to prior art roller bearings.

12 Claims, 10 Drawing Sheets

(51) Int. Cl.
  *F16C 11/04* (2006.01)
  *F16C 25/02* (2006.01)
  *F16C 33/10* (2006.01)
  *A01B 71/04* (2006.01)
  *A01B 59/00* (2006.01)
  *A01C 7/08* (2006.01)
  *A01C 7/20* (2006.01)

(52) U.S. Cl.
  CPC .............. *A01C 7/201* (2013.01); *F16C 11/04* (2013.01); *F16C 17/10* (2013.01); *F16C 33/104* (2013.01); *F16C 33/20* (2013.01); *F16C 2204/12* (2013.01); *F16C 2204/14* (2013.01); *F16C 2310/00* (2013.01)

(58) Field of Classification Search
  CPC .. A01B 59/00; A01C 7/08; A01C 7/00; A01C 7/201; A01C 7/20
  See application file for complete search history.

(56) References Cited

U.S. PATENT DOCUMENTS

| | | |
|---|---|---|
| 3,837,068 A | 9/1974 | Dunn |
| 3,923,422 A | 12/1975 | Ianniello et al. |
| 4,601,592 A | 7/1986 | Jatczak et al. |
| 5,351,635 A | 10/1994 | Hulicsko |
| 6,568,063 B1 | 5/2003 | Sweeney et al. |
| 7,481,171 B2 | 1/2009 | Martin |

FOREIGN PATENT DOCUMENTS

| | | |
|---|---|---|
| GB | 846397 | 8/1960 |
| IN | 576CHE2013 | 7/2015 |

AGRICULTURAL PLANTER HAVING TAPERED BEARINGS ON ROW UNIT MOUNTING BRACKET

CROSS-REFERENCE TO RELATED APPLICATIONS

This application claims priority to previously filed provisional application, U.S. Ser. No. 62/304,969, filed Mar. 8, 2016, which is herein incorporated by reference in its entirety.

BACKGROUND OF THE INVENTION

As technology has become more and more important in farming operations, such as in precision farming, proper maintenance of equipment is important. In a row planter, the parallel linkage arms on each row unit include bushings or bearings which allow pivotal movement of the linkage arms. These bearings wear over time. When the bushings are new, the linkage arms maintain a level row unit and keep the unit running smoothly. However, when the bearings/bushings become worn, chatter increases on the row unit, which then increases the vibration in the seed meter and the seed tube, which leads to less accurate planting of seeds. Thus, the bearings or bushings must be replaced periodically, which is a time-consuming process.

Some row planter manufacturers use a roller bearing, in a cup or race (as shown in FIGS. 17 and 18 of the provision application) which tends to reduce wear, if properly maintained through periodic greasing. But greasing the bearings is another operation which takes time. For example, typically each row unit has four link arms, and each arm has a bearing at each end. Thus, each row unit has eight bearings which require greasing. Tool bars with 36 row units are used in some farming operations, with a total of 288 bearings to grease. Eliminating the need to grease bearings would be a huge time saver.

Therefore, a primary objective of the present invention is the provision of an improved bearing for row planter units which minimizes maintenance and replacement time and costs.

Another objective of the present invention is a provision of a method of adjusting the bearings on the linkage arm of a row planter unit so as to accommodate time-induced wear.

A further objective of the present invention is the provision of tapered bearing for use on the ends of link arms on row planter units which eliminate the need to grease the bearings.

A further objective of the present invention is the provision of tapered bearings for use on row planter link arms which are adjustable as the bearings wear during operation of the row planter units in the field.

Still another objective of the present invention is the provision of a row planter unit with link arms utilizing tapered bearings which can be quickly and easily adjusted to accommodate wear on the bearings. Yet another objective of the present invention is the provision of an improved bearing for the link arms of the row planter unit which are made of a low friction, durable material.

A further objective of the present invention is the provision of an improved bearing for the ends of the link arm on a row planter unit, where the bearing is locked so as to preclude rotation of the bearing during use and transport of the row planter units.

These and other objectives will become apparent from the following description of the invention.

SUMMARY OF THE INVENTION

A low friction bearing is used on each end of each link arm on an agricultural seed row planter unit. The bearing has frusto conical shape and is received in a race or up pressed into a hole in the end of the link arm. In one embodiment, the bearing is locked to the mounting bolt of the link arm via an anti-rotation pin. As the bearing wears during operation of the row unit in the field, the bolt can be tightened to adjust the bearing, thereby minimize or eliminate chatter for the row unit. The adjustability of the bearing eliminates the need to replace the bearings as frequently, as compared to the prior art bearings. The adjustable bearing does not require grease, and thus eliminates maintenance and extends the useful life to minimize replacement, so as to save substantial time, as compared to prior art roller bearings.

The invention is also directed toward a method of adjusting a link arm on the mounting bracket of a seed planter row unit. Each end of the link arm is coupled to the mounting bracket of the row unit using a tapered, non-roller, greaseless bearing. The method of adjusting the link arm simply requires tightening of the bearing as bearing wear arises. Each bearing can be tightened, as needed, independently of the other bearings.

DETAILED DESCRIPTION OF THE INVENTION

Figure 1:
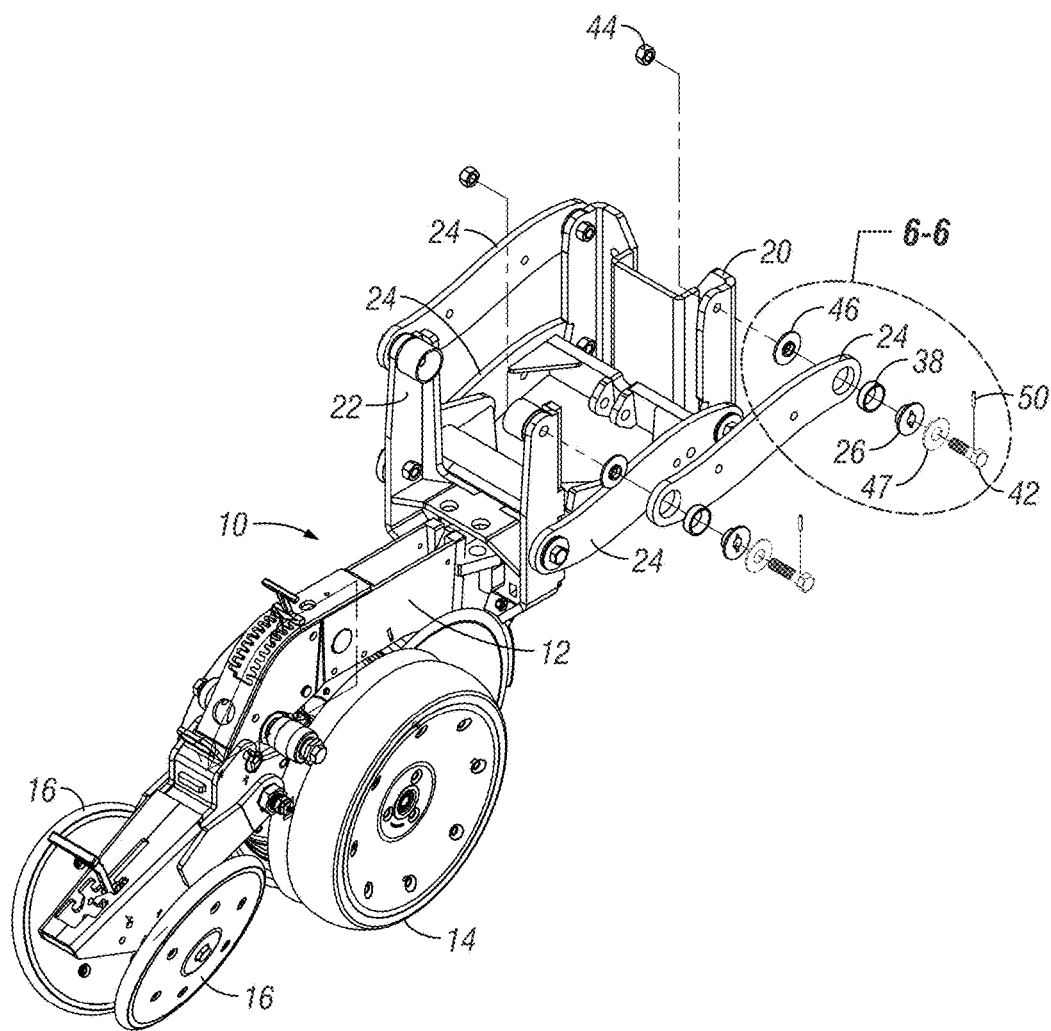
FIG. 1 is a perspective view of a first embodiment of the row planter using tapered bearings on the row unit, according to the present invention.
Figure 2:
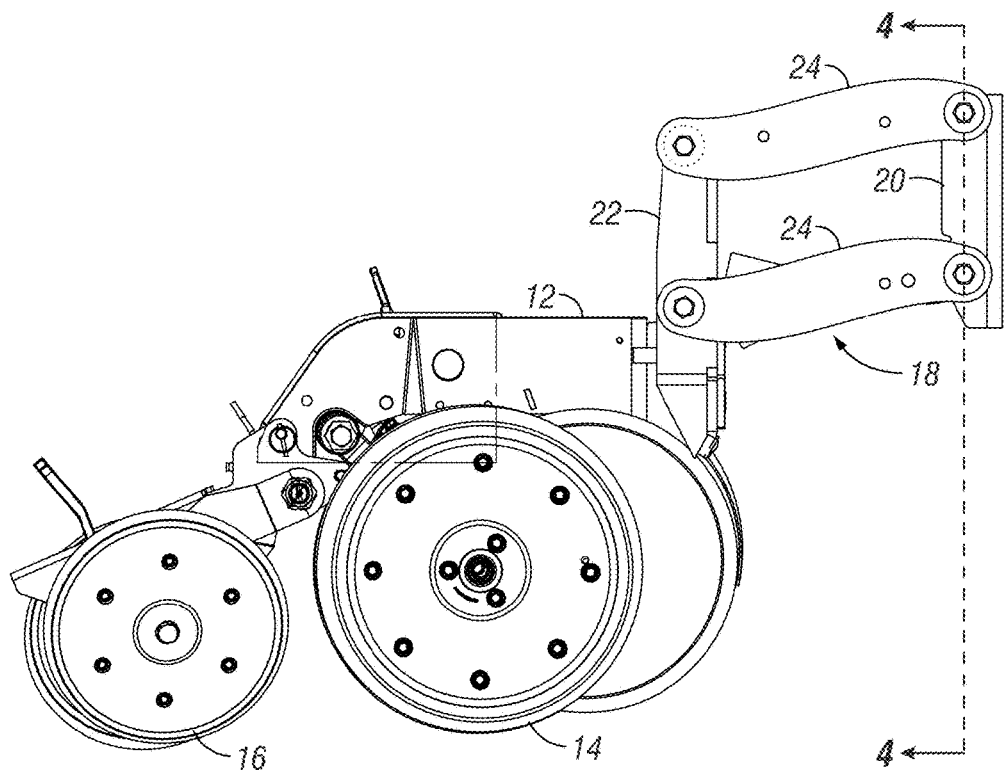
FIG. 2 is a side elevation view of the row planter shown in FIG. 1.
Figure 3:
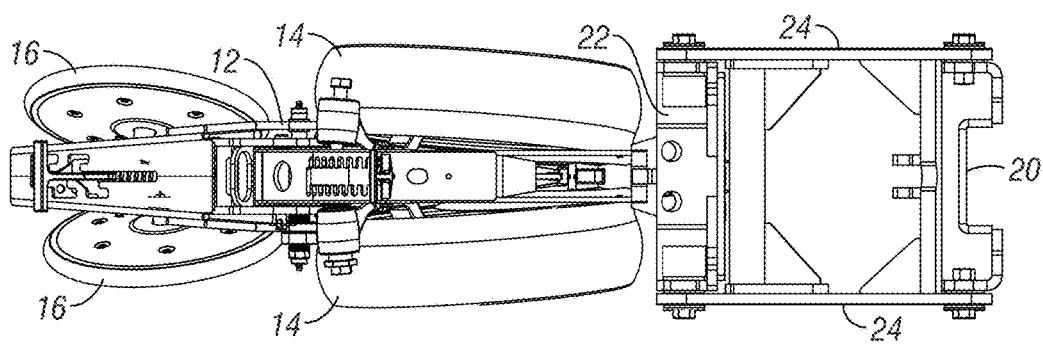
FIG. 3 is a top plan view of the row planter shown in FIG. 1.
Figure 4:
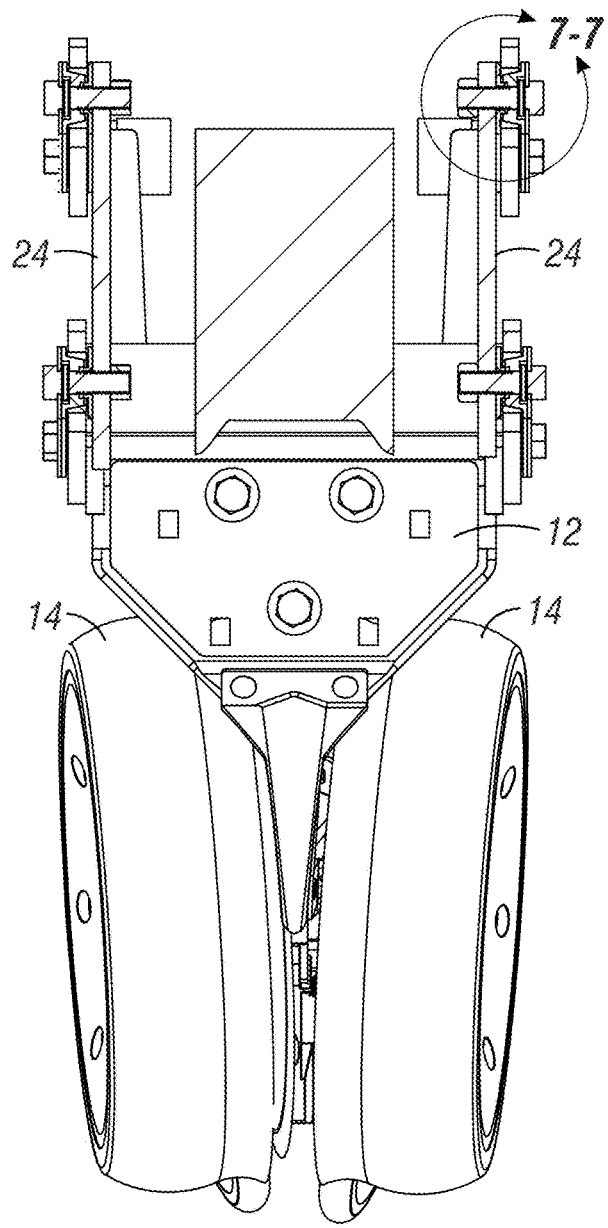
FIG. 4 is a sectional view taken along lines 4-4 of FIG. 2.
Figure 5:
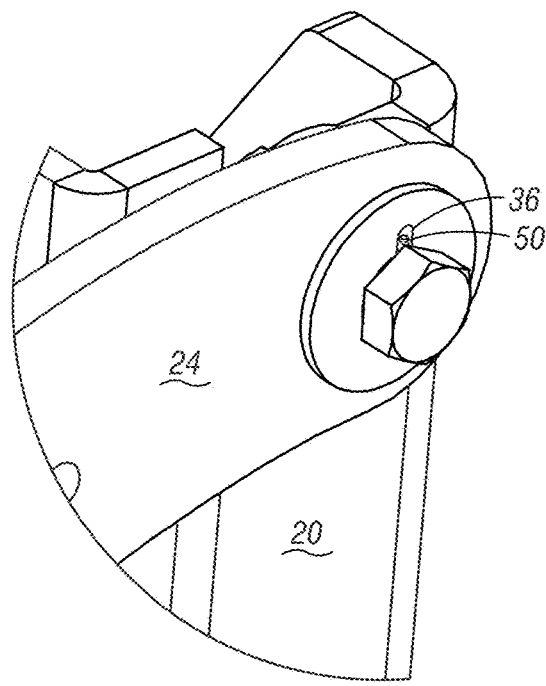
FIG. 5 is an enlarged perspective view of the front right upper corner of the row unit mounting assembly.
Figure 6:
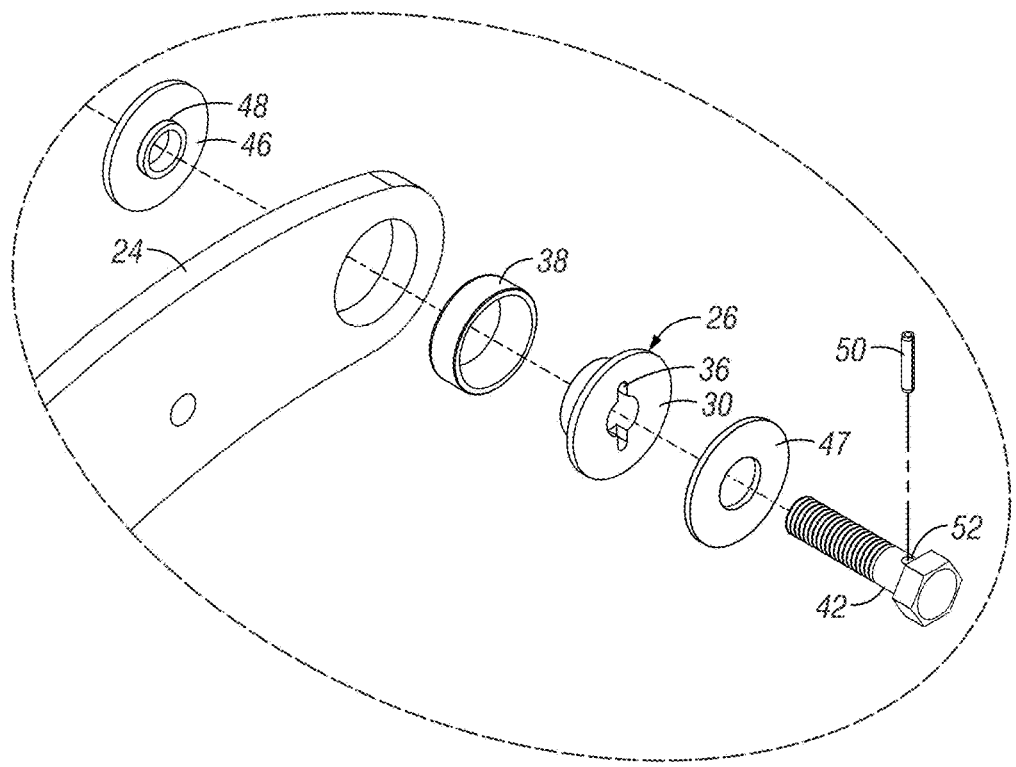
FIG. 6 is an enlarged exploded view of the tapered bearing, bolt, and anti-rotation pin, taken along line 6-6 of FIG. 1.

Agricultural row planters are commonly used in farming. The planter typically includes a tool bar hitched to a tractor and having a plurality of row unit planters mounted to the tool bar. FIG. 1 shows the basic structure of a row unit 10, which includes a frame 12 to support a pair of guide wheels 14 and pair of closing wheels 16. The row unit 10 is mounted to the tool bar (not shown) with a mounting bracket assembly 18. The mounting bracket assembly 18 includes a front plate 20, a rear plate 22, and upper and lower linking arms 24 extending between the plates 20, 22 on each side of the assembly 18.

The present invention is directed towards a tapered bearing 26 used in mounting each end of each link arm 24 to the front plate 20 or to the rear plate 22. The tapered bearing 26 has a tapered body 28, with an outer flange 30 and a center opening 32. In a first embodiment shown in FIGS. 1-7, the flange 30 includes a slot 36. The bearings 26 are preferably made of a low friction composite material, such as Nylatron, or alternatively may be an oil impregnated material, such as brass or aluminized bronze, or plastic.

Figure 7:
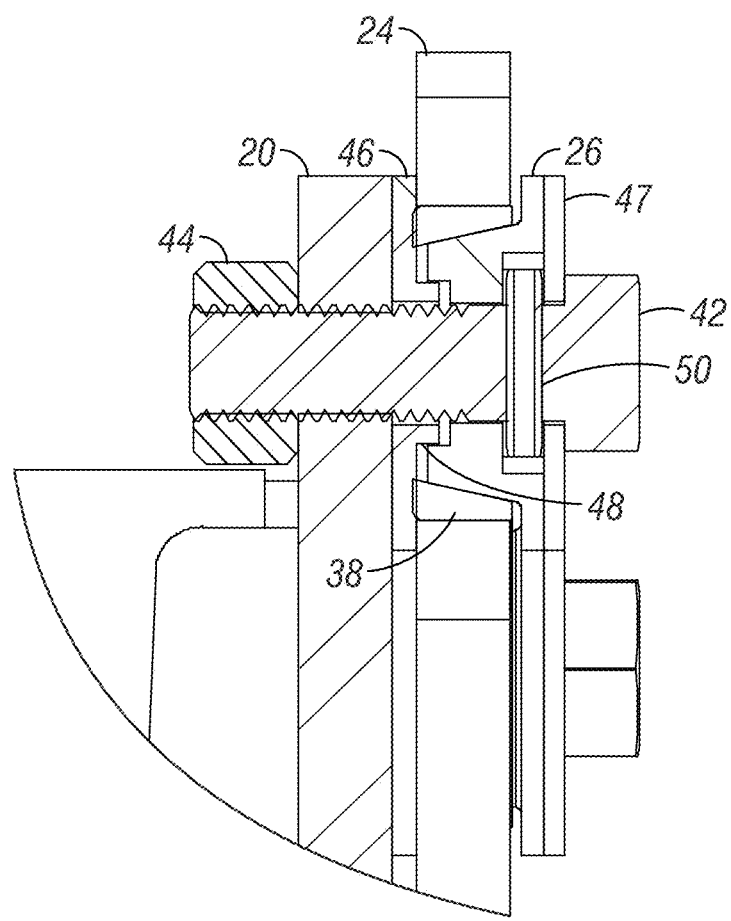
FIG. 7 is an enlarged sectional view taken along the line 7-7 of FIG. 4.
Figure 8:
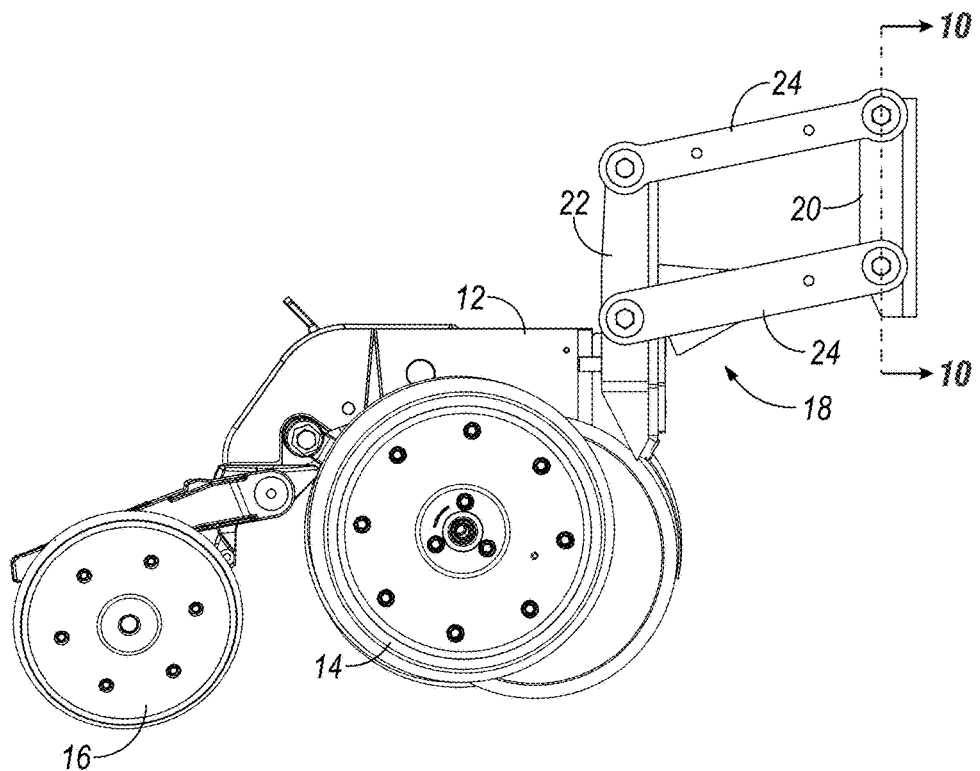
FIG. 8 is a side elevation view of a second embodiment of the row unit mounting assembly with tapered bearings, according to the present invention.
Figure 9:
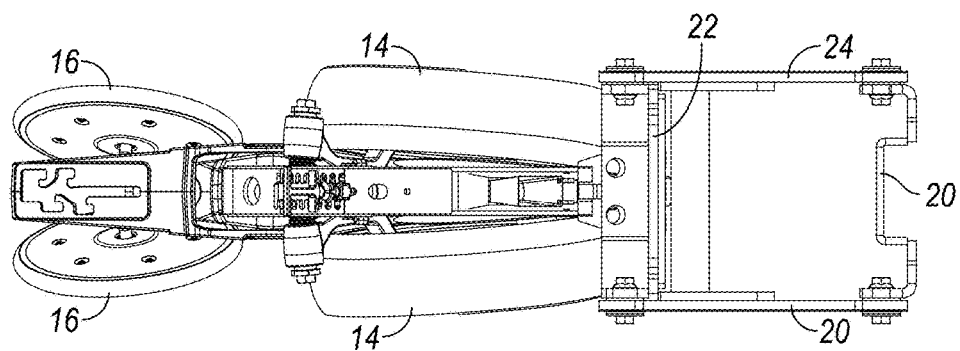
FIG. 9 is a top plan view of the row unit shown in FIG. 8.
Figure 10:
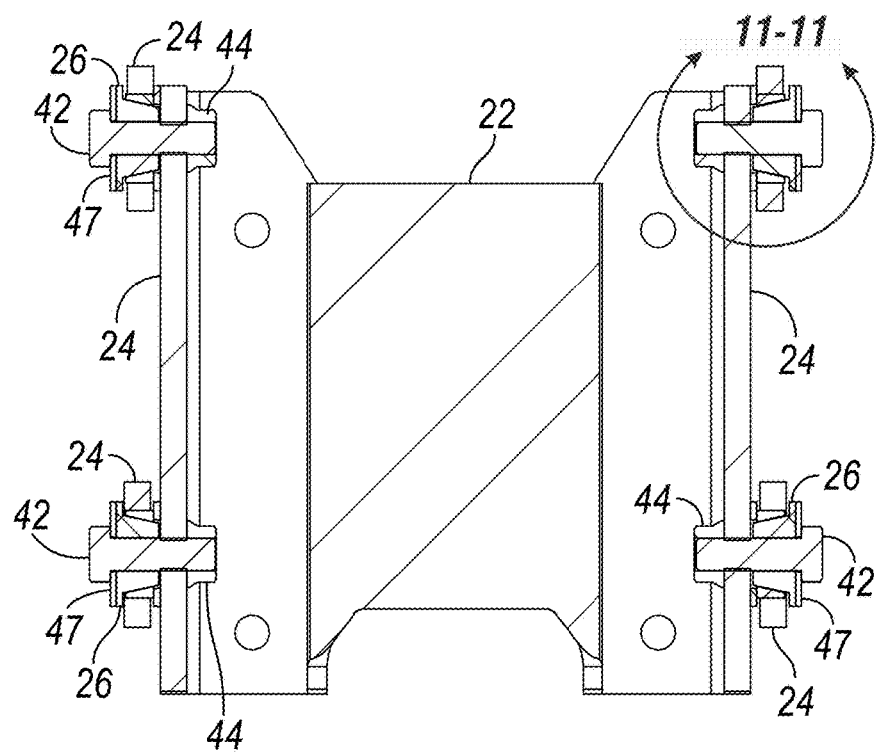
FIG. 10 is a sectional view taken along lines 10-10 of FIG. 8.

The bearing 26 is received in a tapered cup or race 38 press fit or otherwise mounted in a hole 40 in the end of the link arm 24. The inside diameter of the cup 38 and the outside diameter of the bearing 26 matingly engage, as seen in FIG. 7. A bolt 42 extends through the center hole 32 of the bearing 26 and through a threaded hole in the respective front or rear plate 20, 22 to pivotally connect the link arm 24 to the respective plate 20, 22. A jam nut 44 is threaded on the inner end of the bolt 42 to prevent the bolt 42 from loosening. A spacer washer 46 is preferably used on the bolt 32 between the link arm 24 and the plate 20, 22. The washer 46 may include a guide shoulder 48, is also shown in FIG. 7. A second washer 47 is placed on the bolt 42 between the bolt head and the bearing flange 30. The washers 46, 47 are preferably made from a low-friction material, such as Nylantron. A spring pin 50 extends through a pin hole 52 in the bolt 42, with the ends of the pin 50 being received in the slot 36 in the bearing flange 30. The pin 50 prevents the bearing 26 from rotating relative to the bolt 42 when the link arms 24 pivot relative to the plates 20, 22.

In a second embodiment of the bearing is shown in FIGS. 8-16, the spring pin 50 and the associated slot 36 and bolt hole 52 are eliminated. Otherwise, the structure, operation and function of the second tapered bearing embodiment is the same as the first embodiment described above for FIGS. 1-7.

Figure 11A:
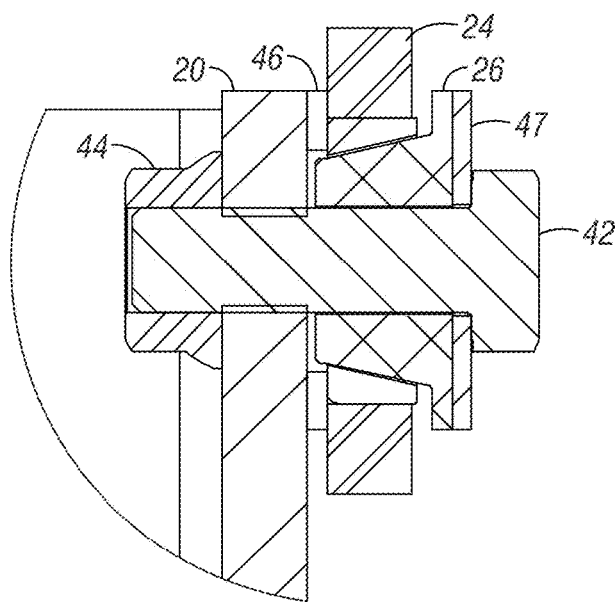
FIG. 11A is an enlarged sectional view taken along line 11-11 of FIG. 10, showing a tapered bearing worn over time.
Figure 11B:
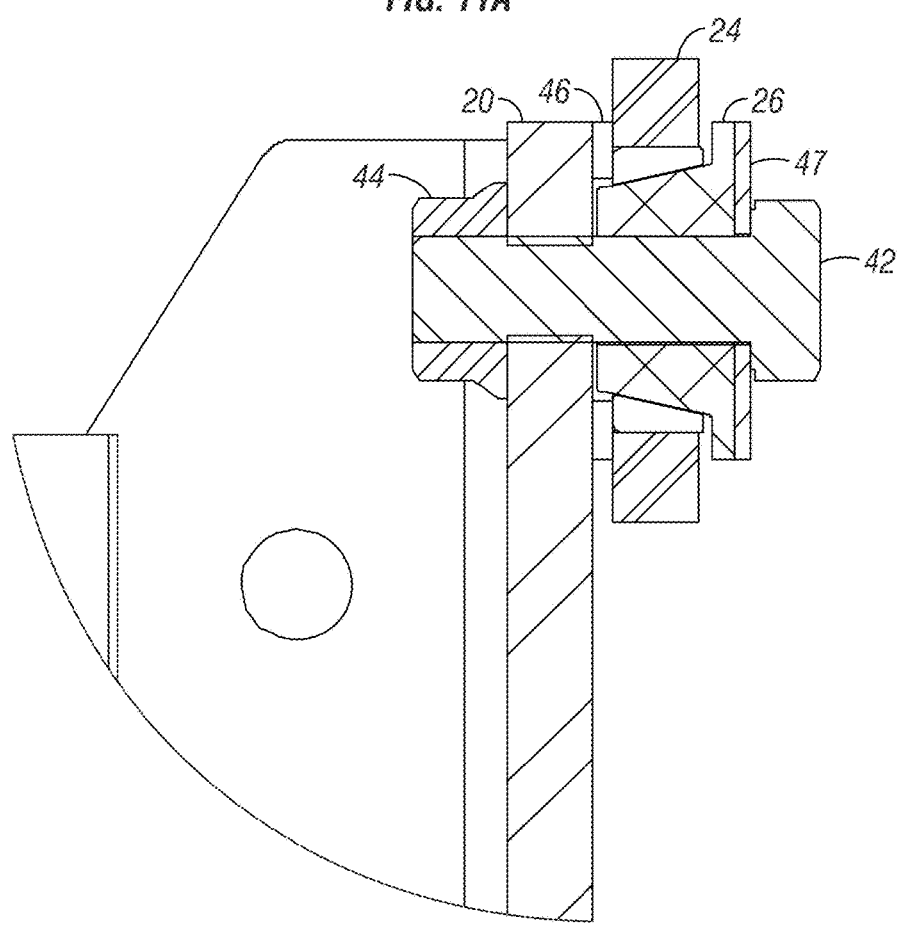
FIG. 11B is a view similar to FIG. 11A, wherein the bolt has been tightened to accommodate the worn bearing.
Figure 12:
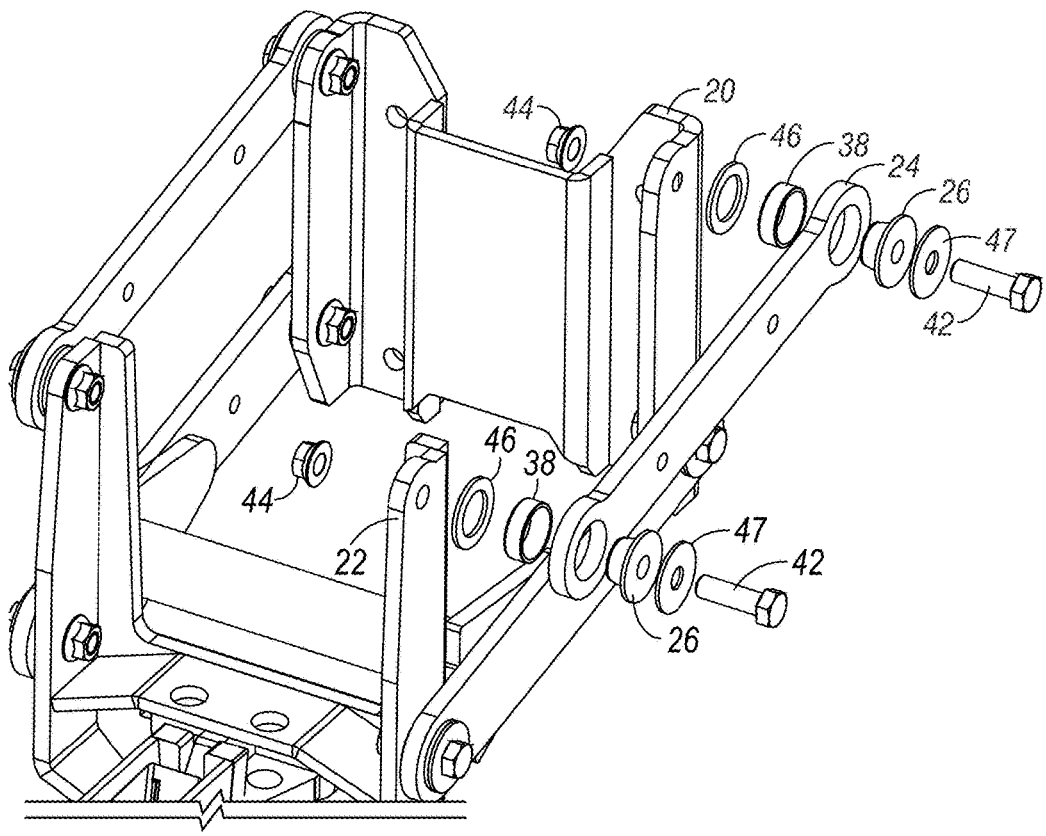
FIG. 12 is a partially exploded view of the row unit mounting assembly shown in FIGS. 8 and 9.
Figure 13:
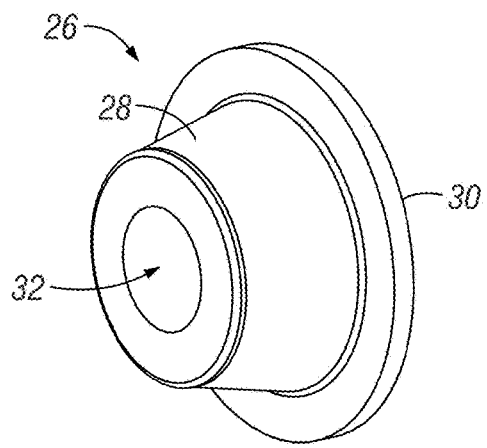
FIG. 13 is a perspective view of the tapered bearing according to the second embodiment of the invention.
Figure 14:
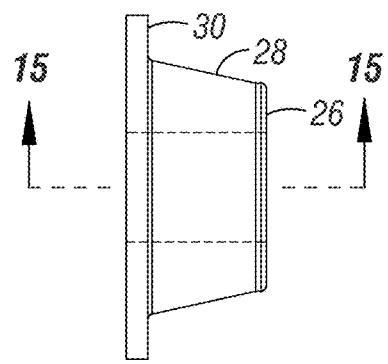
FIG. 14 is a side elevation view of the tapered bearing shown in FIG. 13.
Figure 15:
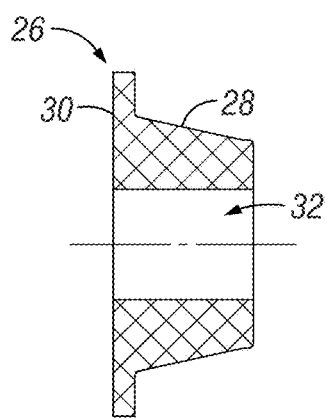
FIG. 15 is a sectional view taken along lines 15-15 of FIG. 14.
Figure 16:
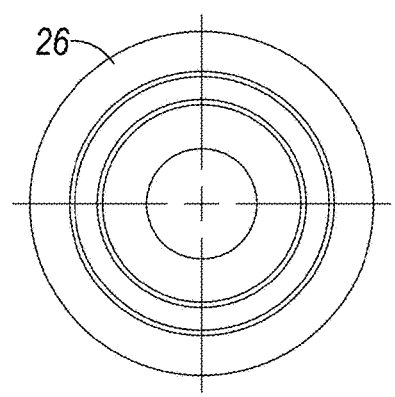
FIG. 16 is an end elevation view of the tapered bearing shown in FIG. 13.

When the linkage arms 24 are initially mounted on the plates 20, 22, the bolt 42 and nut 44 are tightened such that the tapered bearing is in a first position, as shown in FIG. 11A. Over time and through usage of the row planter, wear takes place between the bearing 26 and the cup 38. When wear becomes excessive, the bolt and nut 42, 44 can be tightened to draw the bearing 26 further into the cup 38, thereby accommodating the wear and increasing the useful life the bearing 26. This adjustment method is simpler, and saves time and money, as compared to replacement of bearings. The tapered bearings 26 also eliminate the need to grease the bearings 26 at each end of each link arm 24.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An agricultural row planter comprising:
   a tool bar;
   a plurality of row units;
   a plurality of mounting assemblies for coupling the row units to the tool bar, and
   each mounting assembly having a front bracket, a rear bracket, and linkage arms pivotally extending between the front and rear mounting brackets;
   each linkage arm having opposite front and rear ends, with a hole in at each end;
   a cup mounted in the hole of each end of the line arms;
   a tapered bearing extending into each cup, the bearing having a tapered outer surface and the cup having a tapered inner opening to matingly receive the tapered outer surface of the bearing so that the bearing is adjustable from an initial position to a second position;
   a bolt extending through the tapered bearing to mount one of the linkage arms to one of the brackets; and
   a pin locking the bolt and bearing together to fix the bearing in one of the initial or second positions.

2. The agricultural row planter of claim 1 wherein the tapered bearings are a composite material.

3. The agricultural row planter of claim 1 wherein the tapered bearings are free from rollers.

4. The agricultural row planter of claim 1 wherein the tapered bearings are oil impregnated.

5. The agricultural row planter of claim 1 wherein the bearing has a slot to receive the pin and prevent rotation of the bearing on the bolt.

6. The agricultural row planter of claim 1 further comprising a washer on the bolt between a head of the bolt and the bearing.

7. The agricultural row planter of claim 1 further comprising a washer on the bolt between the bearing and the link arm.

8. The agricultural row planter of claim 7 wherein the washer includes a shoulder extending into the bearing.

9. The agricultural row planter of claim 1 further comprising a pair of washers on the bolt and on the opposite sides of the bearings.

10. The agricultural row planter of claim 1 wherein the bearing has an outer flange and a tapered body.

11. The agricultural row planter of claim 1 wherein the bearing has a tapered outer surface and the cup has a tapered inner opening to matingly receive the tapered outer surface of the bearing.

12. The agricultural row planter of claim 1 wherein the cup and the bearing have mating tapered surfaces.

* * * * *